(12) United States Patent
Owechko et al.

(10) Patent No.: US 8,645,294 B1
(45) Date of Patent: Feb. 4, 2014

(54) METHOD FOR IMAGE REGISTRATION UTILIZING PARTICLE SWARM OPTIMIZATION

(75) Inventors: Yuri Owechko, Newbury Park, CA (US); Yang Chen, Westlake Village, CA (US); Swarup Medasani, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 554 days.

(21) Appl. No.: 12/583,238

(22) Filed: Aug. 17, 2009

Related U.S. Application Data

(63) Continuation-in-part of application No. 10/918,336, filed on Aug. 14, 2004, now Pat. No. 7,636,700.

(60) Provisional application No. 60/541,557, filed on Feb. 3, 2004.

(51) Int. Cl.
*G06F 15/18* (2006.01)

(52) U.S. Cl.
USPC .......................................................... 706/14

(58) Field of Classification Search
USPC .......................................................... 706/14
See application file for complete search history.

(56) References Cited

U.S. PATENT DOCUMENTS

| | | | |
|---|---|---|---|
| 5,926,568 A * | 7/1999 | Chaney et al. | 382/217 |
| 7,558,762 B2 | 7/2009 | Owechko et al. | |
| 7,672,911 B2 | 3/2010 | Owechko et al. | |
| 2006/0153472 A1 * | 7/2006 | Sakata et al. | 382/255 |

OTHER PUBLICATIONS

Goshtasby, Ardeshir et al "A region-based approach to Digital Image Registration with Subpixel Accuracy" IEE Transactions on Geoscience and Remote Sensing vol. GE-24 No. 3, May 1986. [Online] Downloaded May 3, 2012 http://ieeexplore.ieee.org/stamp/stamp.jsp?tp=&arnumber=4072476&tag=1.*

Yin, Peng-Yeng. "Particle swarm optimization for point pattern matching" Jounrall of Visual Communication and Image Representation vol. 17, Issue 1, Feb. 2006. [Online] Downloaded May 3, 2012ftp://ftp.ce.unipr.it/pub/cagnoni/RC/sdarticle.pdf.*

Qi Li, Isao Sato and Yutaka MUrakami "Steerable filter based multiscale registration method for JERS-1 SAR and Aster IMages" Geoscience and Remote sensing symposium, Jul. 2007. [Online] Downloaded May 3, 2012.*

Lovbjerg, MOrten et al "Hybrid Particle Swarm Optimiser with Breeding and Subpopulations" 2001. [Online] Downloaded May 3, 2012 http://www.lovbjerghome.dk/Morten/EvaLife/ML_GECCO2001_PSO_with_breeding.pdf.*

(Continued)

*Primary Examiner* — Ben Rifkin
(74) *Attorney, Agent, or Firm* — Tope-McKay & Assoc.

(57) ABSTRACT

Described is a method for image registration utilizing particle swarm optimization (PSO). In order to register two images, a set of image windows is first selected from a test image and transformed. A plurality of software agents is configured to operate as a cooperative swarm to optimize an objective function, and an objective function is then evaluated at the location of each agent. The objective function represents a measure of the difference or registration quality between at least one transformed image window and a reference image. The position vectors representing the current individual best solution found and the current global best solution found by all agents are then updated according to PSO dynamics. Finally, the current global best solution is compared with a maximum pixel value which signifies a match between an image window and the reference image. A system and a computer program product are also described.

21 Claims, 10 Drawing Sheets

(56) References Cited

OTHER PUBLICATIONS

Robinson, Dirk and Peyman Milanfar. "Fundamental Performance Limits in Image Regitration" IEEE Transactions on Image Processing, vol. 13, No. 9, Sep. 2004. [Online] DOwnloaded May 3, 2012. http://ieeexplore.ieee.org/stamp/stamp.jsp?tp=&arnumber=1323100.*

Khosla, D., Moore, C., and Chelian, S. (2007). A Bioinspired system for spatio-temporal recognition in static and video imagery. Proceedings of SPIE, 6560: 656002.

Judea Pearl, et al., "Bayesian Networks," Handbook of Brain Theory and Neural Networks, Technical Report, R-277, Nov. 2000.

Avrim Blum (1996), "On-Line Algorithms in Machine Learning", in Proceedings of the Workshop on On-Line Algorithms.

D. Nister and H. Stewenius, "Scalable recognition with a vocabulary tree," in Proc. CVPR, vol. 5, 2006.

S. Medasani and R. Krishnapuram, "Graph Matching by Relaxation of fuzzy assignments," IEEE Transactions on Fuzzy Systems, 9(1), 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical models for driver behavior recognition in a smart car," Proc. of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Vide-based event recognition: activity representation and probabilistic recognition methods," CVIU 96(2004), 129-162.

Medioni, I. Cohen, F. Bremond, S. Hongeng, R. Nevatia, "Event detection and analysis from video streams," IEEE PAMI. 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

J.C. Bezdek, Pattern Recognition with Fuzzy Objective Function Algorithms, Plenum Press, New York, 1981.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling of Pedestrian Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

D.L. Swets, et al., "Genetics Algorithms for Object Recognition in a complex scene," Proc. of Intl. Conference on Image Processing, vol. 2, Oct, pp. 23-26, 1995.

V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.

Kennedy, J., et al., "Swarm intelligence," San Francisco: Morgan Kaufmann Publishers, 2001.

R.C. Eberhart, et al., "Particle swarm optimization: Developments, applications, and resources," Proceedings of IEEE Congress on Evolutionary Computation (CEC 2001), Korea, 2001.

R. Brits, et al., "A Niching Particle Swarm Optimizer," 2002.

F. Rojas, I. Rojas, R. M. Clemente, and C.G. Puntoner, "Nonlinear blind source separation using genetic algorithms," in Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantative Analysis of Properties and Spatial Relations of Fuzzy Image Regions," Transactions on Fuzzy Systems, 1(2):98-110, 1993.

Y. Owechko, S. Medasani, and N. Srinivasa, "Classifier Swarms for Human Detection in infrared imagery," Proc. of the CVPR workshop on Object Tracking and Classification Beyond the Visible Spectrum (OTCBVS'04) 2004.

Y. Owechko, et al., "Vision-Based Fusion System for Smart Airbag Applications," Intelligent Vehicle Symposium, 2002. IEEE, Publication Date: Jun. 17-21, 2002, vol. 1, on pp. 245-250 vol. 1.

Y. Owechko and S. Medasani, "A Swarm-based Volition/Attention Framework for Object Recognition," IEEE Conference on Computer Vision and Pattern Recognition, San Diego, Proc. of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

(56) References Cited

OTHER PUBLICATIONS

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.
A. Huertas, and R. Nevatia, "Detecting Changes in Aerial Views of Man-Made Structures," IVC200.
R. Mendes, "The Fully Informed Particle Swarm: Simpler, Maybe Better," Special issue of IEEE Trans. on Evol. Computation on Particle Swarm Optimization, vol. 8, No. 3, Jun. 2004.
K.E. Parsopoulos, et al. "On the Computation of All Global Minimizers Through Particle Swarm Optimization," Special issue of IEEE Trans. on Evol. Computation on Particle Swarm Optimization, vol. 8, No. 3, Jun. 2004.
F. van der Bergh, et al., "A Cooperative Approach to Particle Swarm Optimization," Special issue of IEEE Trans. on Evol. Computation on Particle Swarm Optimization, vol. 8, No. 3, Jun. 2004.
A. Ratnaweera, "Self-Organizing hierarchical particle Swarm Optimizer with Time-Varying Acceleration Coefficients," Special issue of IEEE Trans. on Evol. Computation on Particle Swarm Optimization, vol. 8, No. 3, Jun. 2004.
C.A. Coello, "Handling Multiple Objectives With Particle Swarm Optimization," Special issue of IEEE Trans. on Evol. Computation on Particle Swarm Optimization, vol. 8, No. 3, Jun. 2004.
L. Messerschmidt, et al., "Learning to Play Games Using a PSO-Based Competitive Learning Approach," Special issue of IEEE Trans. on Evol. Computation on Particle Swarm Optimization, vol. 8, No. 3, Jun. 2004.
M.P. Wachwiak, et al., "An Approach to Multimodal Biomedical Image Registration Utilizing Particle Swarm Optimization," Special issue of IEEE Trans. on Evol. Computation on Particle Swarm Optimization, vol. 8, No. 3, Jun. 2004.
R. Hassan, B. Cohanim, and O. de Weck, "A Comparison of Particle Swarm Optimization and the Genetic Algorithm," AIAA Conference, 2005.
J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.
J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.
Bradski, G. And S. Grossberg (1995), "Fast learning VIEWNET architectures for recognizing 3-D objects from multiple 2-D views," Neural Networks 8, 1053-1080.
Charniak, E. (1991), "Bayesian networks without tears," AI Magazine 12, 50-63.
Hu, W., D. Xie, et al. (2004), "Learning activity patterns using fuzzy self-organizing neural network," IEEE Transactions on Systems, Man, and Cybernetics—Part B: Cybernetics 34, 1618-1626.
Lazebnik, S., C. Schmid, et al. (2006), "Beyond bags of features: Spatial pyramid matching for recognizing natural scene categories," IEEE Conference on Computer Vision and Pattern Recognition, New York, NY.
Lowe, D. (1999), "Object recognition from local scale-invariant features," International Conference on Computer Vision, Corfu, Greece.
Medasani, S. and Y. Owechko (2007), "Behavior recognition using cognitive swarms and fuzzy graphs," SPIE Defense and Security Symposium, Orlando, FL.
S. Medasani, and Y. Owechko, "Possibilistic Particle Swarms for Optimization," Proceedings 5673 of SPIE/IST Symposium on Electronic Imaging, San Jose, 2005.
Park, S. and J. Aggarwal (2003), "A hierarchical Bayesian network for event recognition of human actions and interactions," ACM SIGMM International Workshop on Video Surveillance, Berkely, CA.
Barbara Zitova and Jan Flusser, "Image registration methods: a survey," Image and Vision Computing 21, pp. 977-1000, 2003.
B. Bhanu, et al., "Adaptive Image Segmentation Using a Genetic Algorithm," IEEE Transactions on Systems, Man, and Cybernetics, vol. 25, No. 12, Dec. 1995.
Office action from U.S. Appl. No. 10/918,336.
Notice of Allowability for U.S. Appl. No. 11/433,159, Oct. 29, 2009.
Reply to Notice of Allowability for U.S. Appl. No. 11/433,159, Dec. 7, 2009.
Notice of Allowability for U.S. Appl. No. 10/918,336, Aug. 20, 2009.
Notice of Allowability for U.S. Appl. No. 11/800,265, Apr. 5, 2010.
Notice of Allowability for U.S. Appl. No. 11/367,755, Jun. 2, 2009.
Notice of Allowability for U.S. Appl. No. 11/385,983, Mar. 10, 2009.

\* cited by examiner

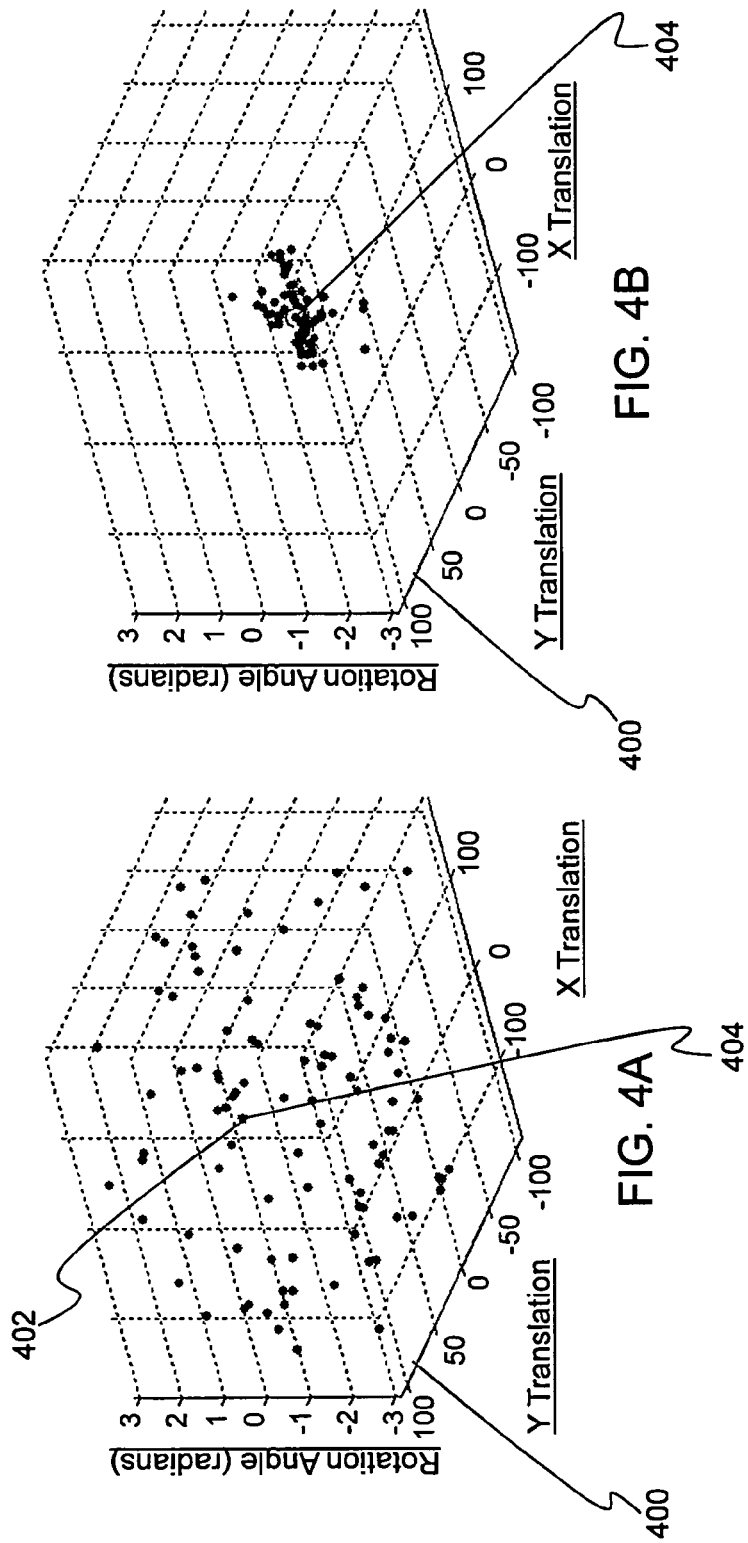

METHOD FOR IMAGE REGISTRATION UTILIZING PARTICLE SWARM OPTIMIZATION

PRIORITY CLAIM

The present application is a Continuation-in-Part Application of U.S. patent Ser. No. 10/918,336, filed Aug. 14, 2004, entitled, "Object Recognition System Incorporating Swarming Domain Classifiers" which claims the benefit of priority of U.S. Provisional Patent Application No. 60,541,557, filed Feb. 3, 2004, entitled, "Object Recognition Using Swarming Image Classifiers."

BACKGROUND OF THE INVENTION (1) Field of Invention

The present invention relates to a method for image registration and, more particularly, to a method for image registration which utilizes particle swarm optimization.

(2) Description of Related Art

Image registration is the process of transforming different sets of data into one coordinate system. For instance, two images of the same scene or set of objects are aligned, where the images may be from different cameras or different viewpoints. Registration is necessary in order to be able to compare or integrate the data obtained from different measurements.

Conventional approaches to image registration are presented by Zitova and Flusser (see Literature Reference No. 11). As described by the authors, current approaches rely on the following steps: selecting and finding a set of features from the candidate images to be registered; matching the features from one image to those of the other image; and estimating a transformation based on the set of matches. FIG. 1 illustrates the typical process of image registration which involves first selecting and detecting features 100 from a reference image 102 and a test image 104. Next, the features or regions are matched 106 between the images 102 and 104. A transform model is then estimated 108. Finally, one of the images 102 or 104 is transformed into the coordinates of the other image 102 or 104 to perform the image registration transformation 110. The result is a set of registered images 112.

Each of the steps above carries potential risks for the process to fail. For instance, features may be unreliable or may be difficult to find in one image or the other. Additionally, feature matching can fail and result in mismatches, which then results in errors in the estimated transformation. Finally, transformation parameter estimation can be complicated and error-prone when the transformation model is complicated, non-linear, or contains multiple parameters.

Therefore, a continuing need exists for an approach which significantly simplifies the image registration process and eliminates each of the disadvantages presented above.

SUMMARY OF THE INVENTION

The present invention relates to a system for image registration utilizing particle swarm optimization. The system comprises one or more processors configured to perform operations of first selecting a set of image windows from a test image. Then, each image window from the test image is transformed, such that a transformation of each image window aligns each image window with a reference image having a center, resulting in a transformed image window. A plurality of software agents are configured to operate as a cooperative swarm to optimize an objective function, wherein each agent is assigned an initial velocity vector to explore a multi-dimensional solution space, where each agent is configured to perform at least one iteration, the iteration being a search in the multi-dimensional solution space for a potential objective function where each agent keeps track of a first position vector representing a current individual best solution that the agent has identified, and a second position vector used to store the current global best solution among all agents. An objective function is then evaluated at the location of each agent. The objective function represents registration quality between a transformed image window and the reference image. Finally, the current global best solution found by all of the agents is compared with an optimum solution, wherein if the global best solution is within a predetermined threshold of the optimum solution, then the global best solution represents the registration.

In another aspect, the system is configured to perform operations of updating the position vectors for each agent according to the following:

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_i(t)]$$
$$\vec{x}_i(t+1) = \vec{x}_i(t) + \chi \vec{v}_i(t+1),$$

where $\vec{x}_i(t)$ is a position vector and $\vec{v}_i(t)$ is a velocity vector at a time t of an i-th agent, $c_1$ and $c_2$ are each parameters that weight an influence of the current best solution $\vec{y}_i$ found by agent i and the current global best solution $\vec{y}_g$ found by all of the agents, w is a momentum constant that prevents premature convergence of the agents, $\chi$ is a constriction factor which influences the convergence of the agents, and $q_1$ and $q_2$ are each random variables that allow the agents to better explore the multi-dimensional solution space.

In another aspect, the system is further configured to perform operations of applying a Gaussian filter to the test image and the reference image to assist the convergence of the plurality of software agents.

In another aspect, the system is further configured to perform operations of applying a translation to each image window in the set of image windows, each image window comprising a center-of-gravity, such that the center-of-gravity of each image window coincides with the center of the reference image.

In yet another aspect, the system is further configured to perform operations of generating an image pyramid of both the test image and the reference image, each image pyramid having a plurality of levels comprising images, wherein each level of each image pyramid is an identical image having a different size and resolution.

In another aspect, the plurality of software agents are configured to explore each level of each image pyramid in search of the objective function, wherein the agents begin at a top level of each image pyramid and continue down each image pyramid until convergence is reached at a lowest level of each image pyramid.

In another aspect, the evaluation of the objective function is carried out at the same image pyramid levels using the reference image and a set of image windows extracted from the test image pyramid.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4A is a plot depicting a swarm of particles at the beginning of an application of PSO for image registration according to the present invention;

FIG. 4B is a plot depicting a swarm of particles at the end of an application of PSO for image registration according to the present invention;

DETAILED DESCRIPTION

Figure 1:
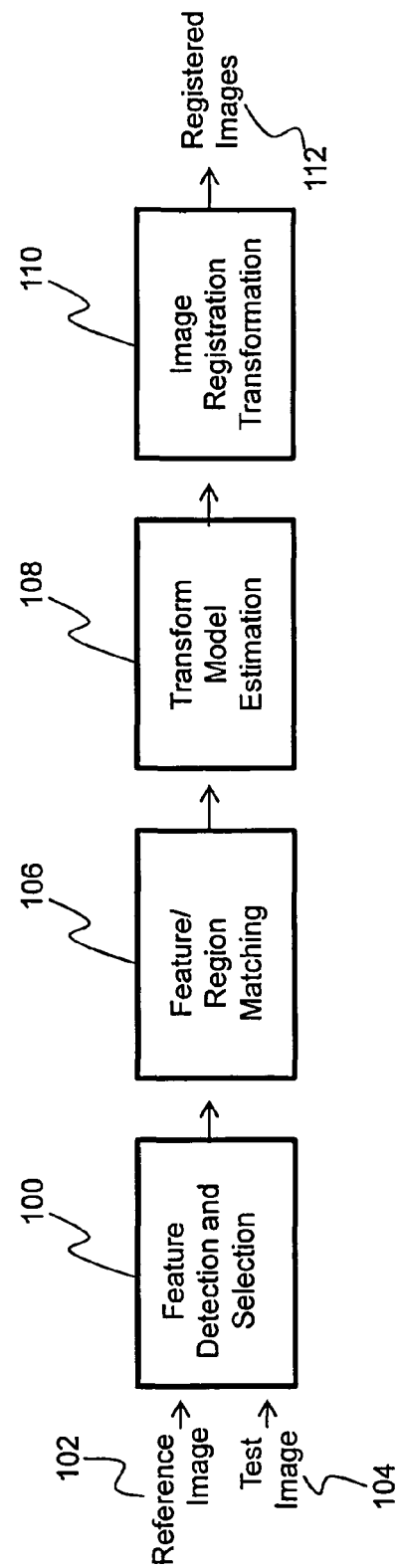
FIG. 1 is a flow diagram depicting a typical image registration process.

The present invention relates to a method for image registration and, more particularly, to a method for image registration which utilizes particle swarm optimization (PSO). The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number.

1. R. C. Eberhart and Y. Shi, "Particle Swarm Optimization: Developments, Applications, and Resources," Proceeding of IEEE Congress on Evolutionary Computation, Korea, 2001.
2. Special Issue of IEEE Trans. On Evol. Computation on Particle Swarm Optimization, Vol. 8, No. 3, June, 2004.
3. S. Medasani and Y. Owechko, "Possibilistic Particle Swarms for Optimization," Proceedings 5673 of SPIE/IST Symposium on Electronic Imaging, San Jose, 2005.
4. Y. Owechko, S. Medasani, and N. Srinivasa, "Classifier Swarms for Human Detection in Infrared Imagery," IEEE Conference on Computer Vision and Pattern Recognition, Washington, D.C., 2004.
5. Y. Owechko and S. Medasani, "A Swarm-Based Volition/Attention Framework for Object Recognition," IEEE Conference on Computer Vision and Pattern Recognition, San Diego, 2005.
6. Y. Owechko and S. Medasani, "Cognitive Swarms for Rapid Detection of Objects and Associations in Visual Imagery," IEEE Swarm Intelligence Symposium, Pasadena, 2005.
7. P. Saisan, S. Medasani, and Y. Owechko, "Multi-View Classifier Swarms for Pedestrian Detection and Tracking," IEEE Conference on Computer Vision and Pattern Recognition, San Diego, 2005.
8. R. Hassan, B. Cohanim, and O. de Weck, "A Comparison of Particle Swarm Optimization and the Genetic Algorithm," American Institute of Aeronautics and Astronautics Conference, 2005.
9. J. F. Schutte, J. A. Reinbolt, B. J. Fregly, R. T. Haftka, and A. D. George, "Parallel Global Optimization with the Particle Swarm Algorithm," Int. J. Numerical Methods in Engineering, 61:2296-2315, 2004.
10. J. Kennedy and W. M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

11. B. Zitova and J. Flusser, "Image Registration Methods: A Survey," Image and Vision Computing, 21:977-1000, 2003.

(2) PRINCIPAL ASPECTS

The present invention has three "principal" aspects. The first is a system for image registration utilizing particle swarm optimization (PSO). The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for image registration utilizing PSO, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(3) INTRODUCTION

Image registration refers to the process of aligning two images of the same scene or set of objects, where the images were taken using different cameras, or from different viewpoints. For the purposes of the present application, the first image is referred to as a reference image, and the second image is referred to as a test image. During image registration, the test image is registered with the reference image.

There are several existing approaches to image registration; however, the common problem with these approaches is that the feature matching, transform model estimation, and final image registration transform processes are all separate. Therefore, the quality of final image registration does not have any effect on the feature matching or transformation model estimation processes. Furthermore, due to the errors in feature detection and matching (e.g., mismatch), the transformation model estimation process becomes problematic. As the transformation model between the two images becomes more complex (e.g., involving more parameters or a more complex form of transformation), finding a consistent set of transformation parameters that gives rise to an accurate registration becomes more difficult in such an open-loop approach.

The present invention improves upon the prior art by utilizing PSO to define an objective function which is easily defined based on the final registration state. Since the sole purpose of feature detection and selection in the present invention is for the evaluation of registration quality and not for matching, as is the case in conventional registration approaches, the image registration process can be greatly simplified.

(4) SPECIFIC DETAILS

The present invention formulates image registration as a search problem, using particle swarm optimization (PSO) to guide the search for a set of consistent registration transform parameters for the transformation model. PSO is a search algorithm that can be used to optimize any objective function in multi-dimensional space efficiently and is naturally parallelizable. PSO is a simple yet powerful population-based algorithm that is effective for optimization of a wide range of functions as described by Eberhart and Shi (see Literature Reference No. 1). PSO models the exploration of a multi-dimensional solution space by a "swarm" of software agents, or particles, where the success of each agent has an influence on the dynamics of other members of the swarm.

Each particle in the swarm resides in the multi-dimensional solution space. The positions of the particles represent candidate problem solutions. Additionally, each particle has a velocity vector that allows it to explore the space in search of an objective function optima. Each particle i keeps track of a position vector $\vec{y}_i$ that represents the current best solution the particle has found. Another position vector $\vec{y}_g$ is used to store the current global best solution found by all of the particles. The velocity and position vectors for particle i are then changed probabilistically according to the following set of dynamic update equations:

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_i(t)]$$
$$\vec{x}_i(t+1) = \vec{x}_i(t) + \chi \vec{v}_i(t+1),$$

where $\vec{x}_i(t)$ is a position vector and $\vec{v}_i(t)$ is a velocity vector at time t of the i-th particle. $c_1$ and $c_2$ are parameters that weight the influence of the "individual best" $\vec{y}_i$ and "swarm best" $\vec{y}_g$ terms. w is a momentum constant that prevents premature convergence of the particles, and $\chi$ is a constriction factor which also influences the convergence of the particles during PSO. Until the present invention, the swarm parameters have always been set by the operator and remained constant. $q_1$ and $q_2$ are random variables that allow the particles to better explore the solution space. The described dynamics cause the swarm to concentrate on promising regions of solution space very quickly with very sparse sampling of the solution space.

Although PSO is a relatively new area of research, extensive literature exists which documents its efficiency and robustness as an optimization tool for high dimensional spaces (see Literature Reference Nos. 2 and 8). Both theoretical analysis and practical experience have demonstrated that PSO converges on good solutions for a wide range of parameter values (see Literature Reference Nos. 3-7). The evolution of good solutions is stable in PSO because of the manner in which solutions are represented (i.e., small changes in the representation result in small changes in the solution). Furthermore, simulations have shown that the number of particles and iterations required are relatively low and scale slowly with the dimensionality of the solution space (see Literature Reference Nos. 9 and 10).

In the present invention, PSO guides a plurality of swarm particles, operating in the transformation parameter space, to potential optimal positions. In the image registration approach based on PSO described herein, the objective function is easily defined based on the final registration state (e.g., any measure of image difference or image quality). Furthermore, there is no need to perform complicated transformation model estimation, as the transformation generation is always a forward operation. Finally, since the sole purpose of feature detection and selection in the present invention is for the evaluation of registration quality and not for matching, as is the case in conventional registration approaches, this process can be greatly simplified.

Figure 2:
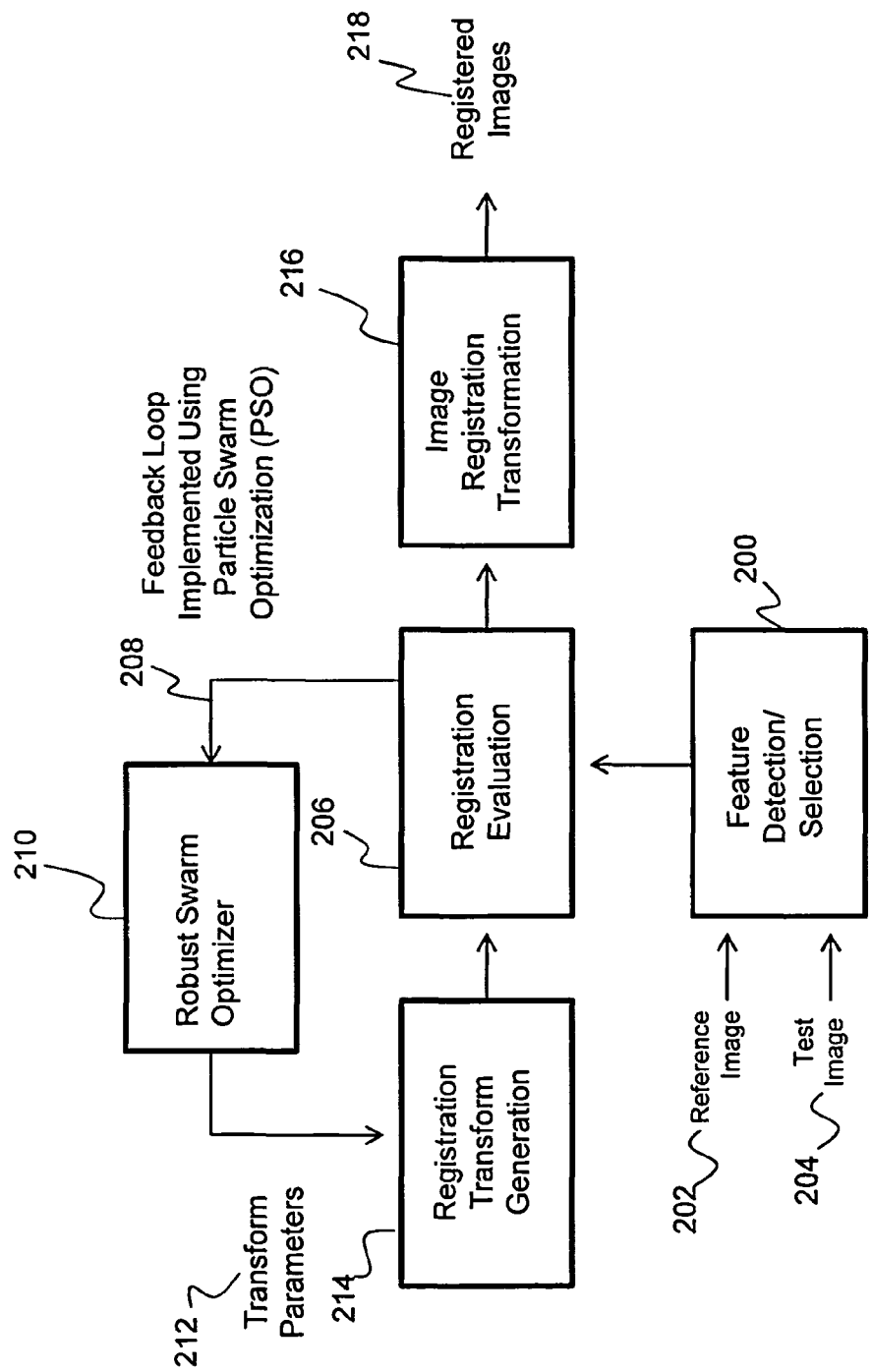
FIG. 2 is a flow diagram depicting image registration using particle swarm optimization (PSO) according to the present invention.

FIG. 2 illustrates a flow diagram of image registration using PSO. Similar to current approaches, features are detected/selected 200 from a reference image 202 and a test image 204. In contrast to current approaches, there is no need for a feature matching process. Thus, errors in mismatch of features can be avoided. An evaluation of registration quality 206 is then performed to determine if the images 202 and 204 are aligned. Immediately following feature detection/selection 200, the images 202 and 204 are not expected to be properly aligned. However, the registration evaluation 206 process is part of a feedback loop implemented using PSO 208 which allows several rounds of registration evaluation 206 to take place until the optimal transform parameters are located. A robust swarm optimizer 210 is responsible for initializing a fixed number of swarm particles in a multi-dimensional solution space. The particles are guided by PSO to search for a set of consistent registration transform parameters 212 used for registration transform generation 214 of a registration transform model, which will be described in more detail below. Non-limiting examples of transformation models include linear and nonlinear transformations, which include translation, rotation, scaling, and affine transformations. Then, the registration evaluation 206 process occurs again to determine if the images 202 and 204 are aligned. If the images 202 and 204 are properly aligned, image registration transformation 216 takes place. Finally, a set of registered images 218 are output.

(4.1) PSO for Image Registration (4.1.1) Registration Model and PSO Parameter Space A typical process of image registration involves transforming (i.e., translating, rotating and scaling) a test image so that it aligns with a reference image. For the purposes of the present application, registration is considered to involve only translation and rotation. However, as can be appreciated by one skilled in the art, the same method may be used for a registration model involving more parameters and more complex forms, provided that the transformation determines a unique correspondence in the reference image for every test image point. The registration transform model can be represented according to the following equation:

$$\begin{bmatrix} x \\ y \end{bmatrix} = R \begin{bmatrix} u \\ v \end{bmatrix} + \vec{t}, \quad R = \begin{bmatrix} \cos(\theta) & \sin(\theta) \\ -\sin(\theta) & \cos(\theta) \end{bmatrix}, \quad \vec{t} = \begin{bmatrix} t_x \\ t_y \end{bmatrix},$$

where R is a rotation matrix, $\vec{t}$ is a translation vector, $\theta$ is a rotation angle, $t_x$ is translation in the x direction, $t_y$ is translation in the y direction, and (x, y) and (u, v) are the image coordinates in the reference image and test image, respectively. Therefore, the image registration transformation is completely specified by a vector of three parameters:

$$\vec{x} = [\theta, t_x, t_y]^T,$$

where, as noted above, $\theta$ is a rotation angle about an axis normal to the image, $t_x$ is translation in the x direction, $t_y$ is translation in the y direction, T indicates the transpose of a matrix or vector, and the vector i contains the parameters in the PSO framework. Thus, according to the present invention, to register two images is to find the vector i that will align the two images according to the registration transform model equation described above.

(4.1.2) Objective Function

The objective function, denoted as J, for the PSO algorithm utilized in the present invention must exhibit either a maximum or minimum value when two images are aligned, or registered. Many choices exist for the objective function, which are based on image similarity or registration quality. Non-limiting examples of similarity measures which may be used include normalized cross-correlation, sum of squared difference (SSD), and mutual information (i.e., for images from different sensor modalities). As can be appreciated by one skilled in the art, each of these similarity measures would be sufficient for demonstrating the invention described herein; however, the sum of absolute difference values of the two images has been selected for its simplicity. In addition, the sum is normalized by the number of pixels involved in the operation, so the result becomes independent of the size of overlap (i.e., only overlapping areas are used for computing the difference) of the two images. Lastly, to reduce computation, only a fixed number of small windows in the test image are selected, and their transformed versions are used to compute the difference with the reference image. Therefore, for a k-th window of the test image, its contribution $s_k$ to J is defined as:

$$s_k = \lambda_k (I_{max} - \bar{d}_k)$$

where $\lambda_k$ is the fraction of overlap of the k-th window of the test image with the reference image, and $I_{max} > 0$ is the maximum pixel value of the image (e.g., for 8-bit gray scale image, $I_{max}$ is 255). Here, $I_{max}$ represents an optimum solution, wherein if the global best solution found through PSO is within a predetermined threshold of the optimum solution, then the global best solution represents the registration. The optimum solution may be the maximum or minimum of the objective function. $\bar{d}_k$ represents the average absolute difference between the test image window (at the location after transformation) and the reference image and can take values in the range [0, $I_{max}$]. Furthermore, $s_k$ also has a range of [0, $I_{max}$] with a small value indicating that the test image window doesn't match the corresponding reference image window (or doesn't overlap with the reference image). A value $I_{max}$ indicates that the test image window matches the reference image window, pixel by pixel, and completely overlaps with the reference image. Finally, the objective function can be defined as the average of $s_k$:

$$J = \left( \frac{1}{N} \sum_{k=1}^{N} s_k \right) = \left( \frac{1}{N} \sum_{k=1}^{N} \lambda_k (I_{max} - \bar{d}_k) \right),$$

where N is the number of test image windows, $\Sigma$ represents a summation, and J is a function of $\vec{x}$ with maximum value $I_{max}$ and minimum value 0.

The image windows from the test image, which are used to compute J, are selected from areas with contrast rather than uniformly colored areas. Therefore, a large $\bar{d}_k$ is produced when the images are not registered and their locations are distributed evenly across the image. Selecting image windows from areas with contrast can be easily accomplished by taking image windows on a regular grid and selecting those windows that pass image contrast criteria, which may be based on image history.

(4.1.3) Registration Using PSO

Figure 3:
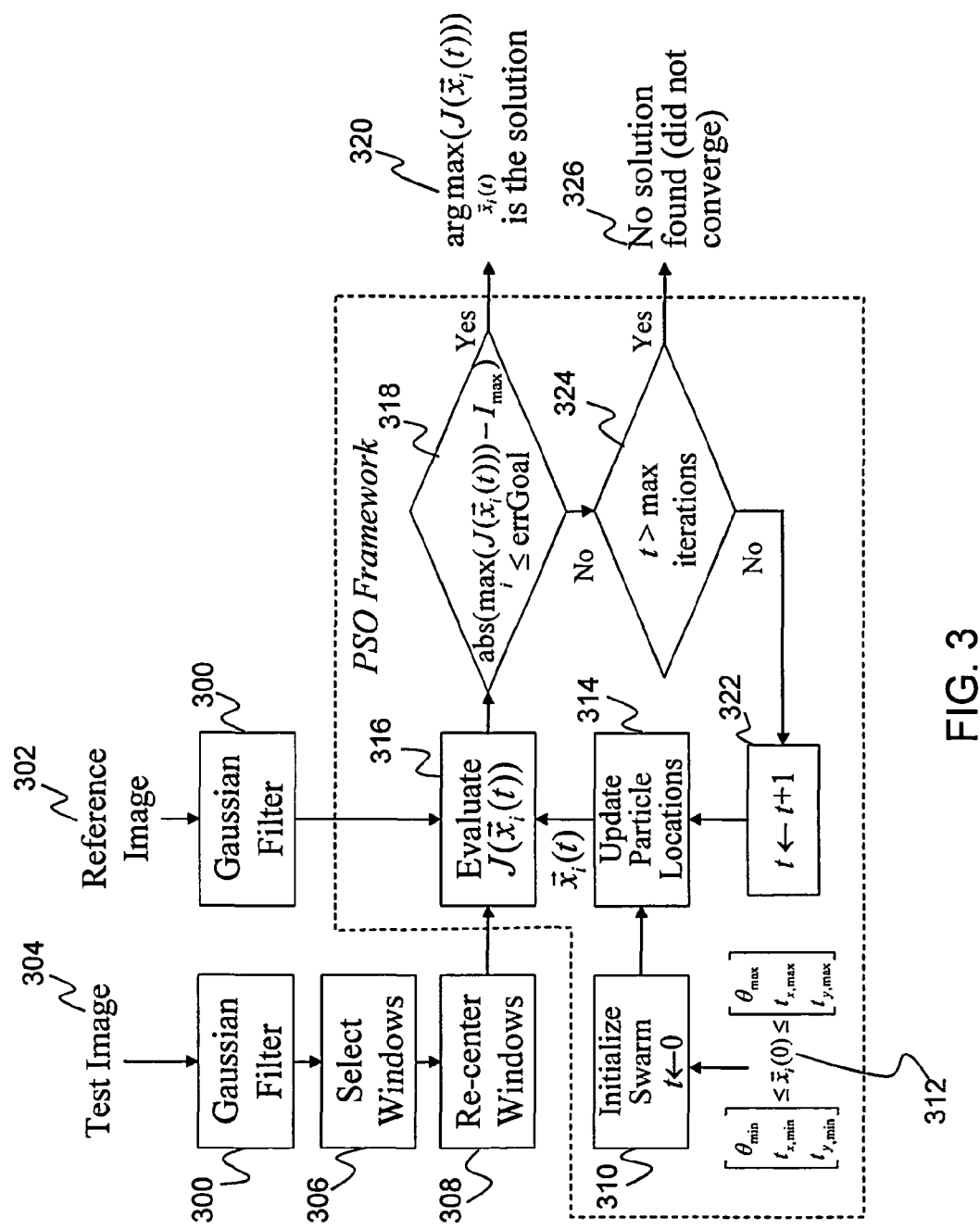
FIG. 3 is an expanded flow diagram depicting image registration using PSO according to the present invention.

FIG. 3 illustrates an expanded flow diagram of image registration using PSO according to the present invention. First, a Gaussian filter 300 applies a Gaussian kernel to both input images (a reference image 302 and a test image 304) to blur each image to achieve better convergence. As a non-limiting example, a Gaussian kernel with a standard deviation of 1.5 to 5.0 in units of pixels is used to filter the images prior to registration. In order to increase the chance of convergence, and therefore the chance of finding the true registration, it is optimal to have an objective function J whose surface has a broad base but a sharp peak at the optimum. When the content of an image contains a large amount of fine details, the peak of J is typically very sharp; however, the base is not broad enough, which will adversely affect PSO's success. For this reason, both the reference image 302 and the test image 304 are passed through a Gaussian kernel (low-pass filter) to broaden J's surface.

When images are blurred before registration, the convergence property of the PSO process is improved. However, the peak of the objective function surface can become "dull", which can result in reduced accuracy in registration. Such a problem can be mitigated by replacing the blurred images with the original images, or less blurred images, after the PSO process has closed in on the optimal solution. Additionally, another approach is to use an image pyramid which will be described in further detail below.

The next step in the image registration process is the selection of a set of image windows 306 from the test image 304. As non-limiting examples, the number of image windows typically selected is between ten and twenty windows, and the size of each image window is typically 64×64 pixels, but these numbers can vary depending on the test image 304 size. The test image windows are then re-centered 308 by applying a translation, such that the center of gravity (consider each window a point with unit mass located at the center of the window) of the windows coincides with the image center of the reference image 302. Re-centering the image windows simplifies swarm initialization 310, since the lower and upper limits of the swarm parameters in translation can be kept symmetric. That is, the translation for $t_x$ and $t_y$ can be bound as follows:

$$t_{x,min} \le t_x \le t_{x,max}, t_{x,max} = -t_{x,min} = \text{(width of reference image)}$$

$$t_{y,min} \le t_y \le t_{y,max}, t_{x,max} = -t_{x,min} = \text{(height of reference image)}.$$

In practice, the above bounds can be narrowed by half to achieve even greater efficiency; however, the bounds specified above are all that is required. Additionally, for a rotation angle $\theta$, $-\pi \le \theta \le \pi$. Note that the entire $2\pi$ span for $\theta$ is treated as a continuous region with no boundaries so that a particle with $\theta$ nearing $\pi$ can move into $-\pi$ region and vice versa.

During swarm initialization 310, a fixed number of swarm particles $\vec{x} = [\theta\ t_x\ t_y]^T$ are randomly placed in a three-dimensional solution space bounded by the limits 312 described above. With each iteration, the positions of the particles are updated 314 according to the PSO update equations described above.

The objective function $J(\vec{x}_i(t))$ is then evaluated 316 at the location of every swarm particle $\vec{x}_i(t) = [\theta_i(t)\ t_{x,i}(t)\ t_{y,i}(t)]^T$ at an iteration t for a particle i, and the individual best and swarm best values are updated. The swarm best, defined as $\max_i (J(\vec{x}_i(t)))$, is then compared with $I_{max}$ 318. If the swarm best reaches within errGoal (errGoal>0) of $I_{max}$, where errGoal represents a chosen threshold, the registration is considered complete. For instance, as illustrated in FIG. 3, if abs($\max_i (J(\vec{x}_i(t))) - I_{max}) \le$ errGoal, the particle location for achieving the swarm best, represented by $\underset{i}{\arg\max}\ \bar{x}_i(t)$ (J($\vec{x}_i(t)$)), is the solution 320, where abs represents the absolute value of the given expression and arg max denotes the argument of the maximum, or the set of points of the given argument for which the value of the given expression attains its maximum value. Otherwise, the process proceeds with the next iteration 322 of updating swarm particles 314 according to the PSO update equations. The process of updating the locations of the swarm particles 314 and evaluating $J(\vec{x}_i(t))$ 316 continues until a preset number of iterations has been reached (e.g., t>max iterations) 324. If the preset maximum number of iterations is reached, it is concluded that the PSO did not converge and the registration has failed 326.

FIGS. 4A and 4B depict examples of plots of the locations of a particle swarm during an image registration according to the present invention. FIG. 4A illustrates a set of swarm particles in a multi-dimensional solution space 400 at the beginning of the image registration process, wherein the shaded point represents the best location found in the current iteration 402. The point located at the center of the shaded point represents the best location found given all iterations so far 404. FIG. 4B illustrates the distribution of the swarm in the multi-dimensional solution space 400 at the final iteration. As shown, the swarm has now concentrated near the optimal location, which is the point representing the best location, given all iterations 404.

Figure 5A:
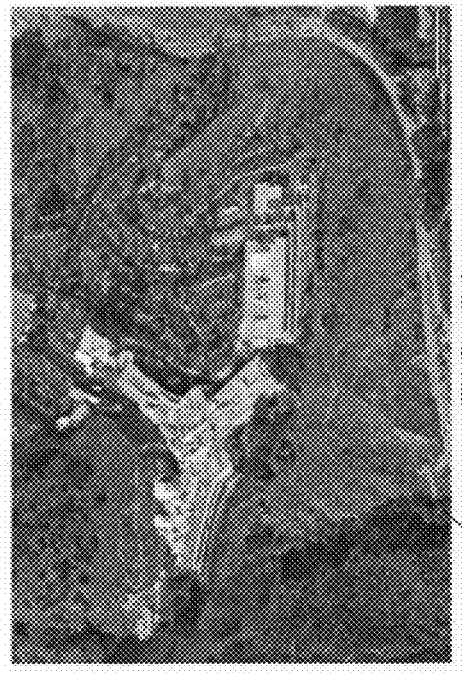
FIG. 5A is an illustration of a reference image to be registered according to the present invention.
Figure 5B:
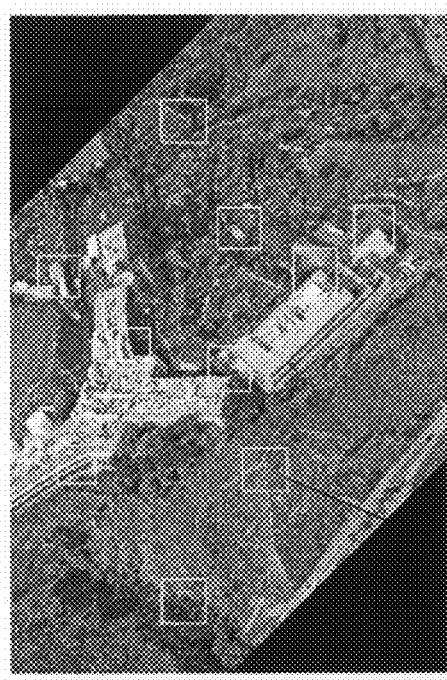
FIG. 5B is an illustration of a test image to be registered according to the present invention.
Figure 5C:
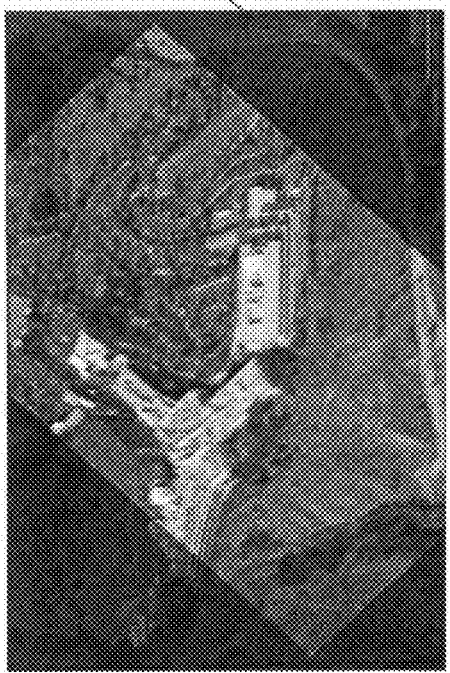
FIG. 5C depicts an illustration of a result of image registration according to the present invention.

FIGS. 5A-5C display an example of image registration performed by the method described herein. FIGS. 5A and 5B are illustrations representative of two images to be registered, where FIG. 5A represents a reference image 500 and FIG. 5B represents a test image 502. As shown, the test image 502 is a rotated version of the reference image 500. A set of manually selected image feature windows 504 are shown as square outlines within the test image 502. Finally, FIG. 5C depicts the image registration result 506 of the reference image 500 and the test image 502. As a non-limiting example, the image registration can be performed with one hundred swarm particles and an errGoal of 15.

(4.1.4) Blurring Images for Better Convergence

In order to increase the chance of convergence and therefore the chance of finding the true registration, it is advantageous to have an objective function J whose surface has a broad base but sharp peak at the optimum. When the image content contains large amount of fine details, the peak of J is typically very sharp, but the base is not broad enough, which will adversely affect PSO's success. For this reason, both the reference and the test images are passed through a Gaussian kernel (low-pass filter) to broaden J's surface.

Figure 6A:
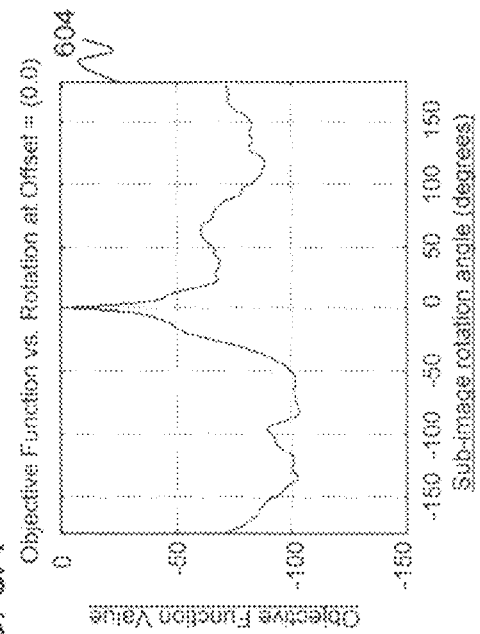
FIG. 6A is a surface plot of an objective function for a sample image according to the present invention.
Figure 6B:
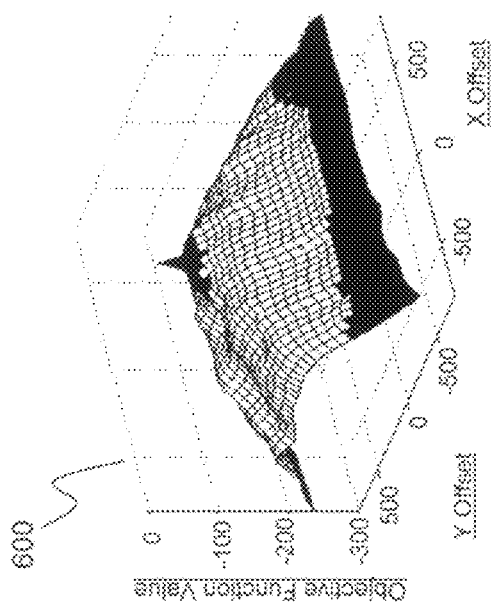
FIG. 6B is a plot depicting two cross-sections of an objective function for a sample image according to the present invention.
Figure 6C:
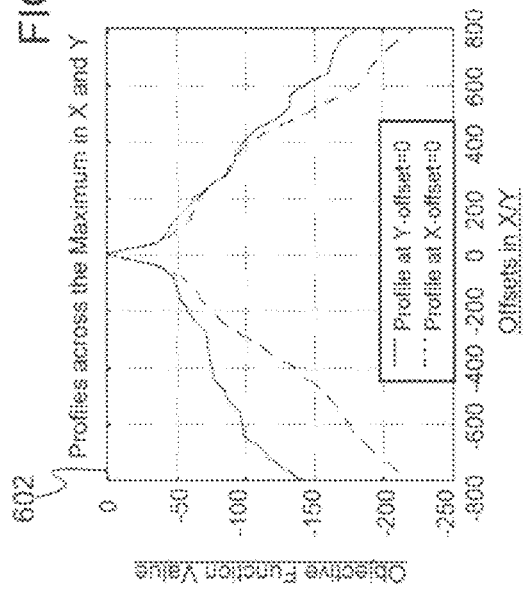
FIG. 6C is a plot depicting an objective function for a sample image along a rotation dimension.

FIGS. 6A-6C illustrate objective function plots for a sample image scene in various dimensions, where the images are blurred by a 31×31 pixel Gaussian kernel with a standard deviation of 5. The test image in this case is the same image with windows, or sub-images, manually selected at fourteen different locations. FIG. 6A depicts the surface of J with no rotation 600. FIG. 6B is a plot of two cross-sections of J 602 shown in FIG. 6A. FIG. 6C is a plot of J along the rotation dimension at 0 translation (or off-set) 604.

(4.1.5) Normalized Parameter Space

For image registration, the parameter space $\vec{x}$ is different in each dimension: two in translations and one in rotation. In order to simplify the process of updating particles, an alternative parameter space is adopted in which all dimensions of parameter $\vec{x}$ are normalized to $[-1, 1]$, accompanied by a vector of scale factors, one for each dimension. The update of particle positions according to the PSO update equations is carried out in the normalized parameter space, and the particle positions are scaled using the scale factors before the objective function is evaluated. Thus, the particles' positions in all dimensions can be updated uniformly, while also easily changing the actual parameter space by changing the scale factor vector. These aspects are especially useful in the registration using an image pyramid as will be described in detail below.

Using a normalized parameter space scheme, the PSO update equations do not change. However, the bounds for the parameters become:

$$\begin{bmatrix} -1 \\ -1 \\ -1 \end{bmatrix} \leq \vec{x}_i \leq \begin{bmatrix} 1 \\ 1 \\ 1 \end{bmatrix}$$

with the following vector of scale factors:

$$\alpha = \begin{bmatrix} \pi \\ t_{x,max} \\ t_{y,max} \end{bmatrix},$$

where $t_{x,max}$ and $t_{y,max}$ are bounded as described in section 4.1.3. Then, $\alpha$ is used when the objective function $$J = \left(\frac{1}{N}\sum_{k=1}^{N} s_k\right) = \left(\frac{1}{N}\sum_{k=1}^{N} \lambda_k(I_{max} - \vec{d}_k)\right)$$

evaluated according to the following:

$$J(\alpha \cdot \vec{x}_i(t)),$$

where the operator "·" stands for entry-wise (Hadamard) product and a is the vector of scale factors shown above.

(4.1.6) Limiting Maximum Speed in Each Dimension

In the application of image registration described in the present invention, the objective function surface near the peak has a certain width in each dimension. Particles moving too fast may miss the chance of landing in the peak region during the update. Therefore, a limit to the speed of a particle in each of the particle's dimensions, or parameters, is imposed before using the speed vector to update the swarm particle position according to the PSO update equations. Thus, $$\vec{v}_i(t+1) \leftarrow \lceil \vec{v}_i(t+1) \rceil_{\vec{v}_{max}},$$

where the operator $\lceil \cdot \rceil$ defines a vector component-wise limiting operation such that the result of $\vec{c} = \lceil \vec{a} \rceil_{\vec{b}}$ ($\vec{b} = \{b_j | b_j > 0, \forall j\}$) is defined as:

$$c_j = \begin{Bmatrix} b_j, & \text{if } a_j > b_j \\ -b_j, & \text{if } a_j < -b_j \\ a_j, & \text{otherwise} \end{Bmatrix}, \forall j.$$

The PSO update equations then become:

$$\vec{v}_i(t+1) = \lceil w\vec{v}_i(t) + c_1 q_1 [\vec{y}_i(t) - \vec{x}_i(t)] + c_2 q_2 [\vec{y}_g(t) - \vec{x}_i(t)] \rceil_{\vec{v}_{max}}$$

$$\vec{x}_i(t+1) = \vec{x}_i(t) + \chi \vec{v}_i(t+1),$$

where $\vec{v}_{max}$ is a vector of (positive) particle speed limits. The registration parameter space in the present invention is then:

$$\vec{v}_{max} = \begin{bmatrix} v_{\theta max} \\ v_{xmax} \\ v_{ymax} \end{bmatrix},$$

where each of the vector components of $\vec{v}_{max}$ is equal to half of the normalized peak width of the objective function surface along the corresponding dimension, which is empirically determined as follows. For $v_{x\ max}$ and $v_{y\ max}$, the dimension is equal to the ratio of the test image window size to the reference image size in x and y, respectively. For $v_{\theta\ max}$, it is 1.5 times the average of two angles divided by $2\pi$. One angle is spanned by the test window width (size in x) at a distance of half the height of the reference image. The other spanned by the test window height (size in y) at a distance of half the width of the reference image. These estimates are dependent on how the input images are blurred; the above estimates are based on using a Gaussian kernel of size 22×22 pixels with a standard deviation of 1.5. Note that in the above, the $\vec{v}_{max}$ components are all expressed in normalized parameter space as are the PSO update equations.

(4.1.7) Registration Using an Image Pyramid

As described above, blurring of the reference image and test image is performed to broaden the objective function surface to achieve better convergence properties. Blurring an image reduces the effective resolution of an image, and subsampling of the blurred image results in little loss of information. Therefore, the same registration performance can be achieved by carrying out the PSO process on a blurred, subsampled image. Once convergence is achieved on the subsampled image, the PSO process is then carried out on the original-sized image to get better registration accuracy. This idea is the basis of a pyramid-based registration method using PSO.

Figure 7:
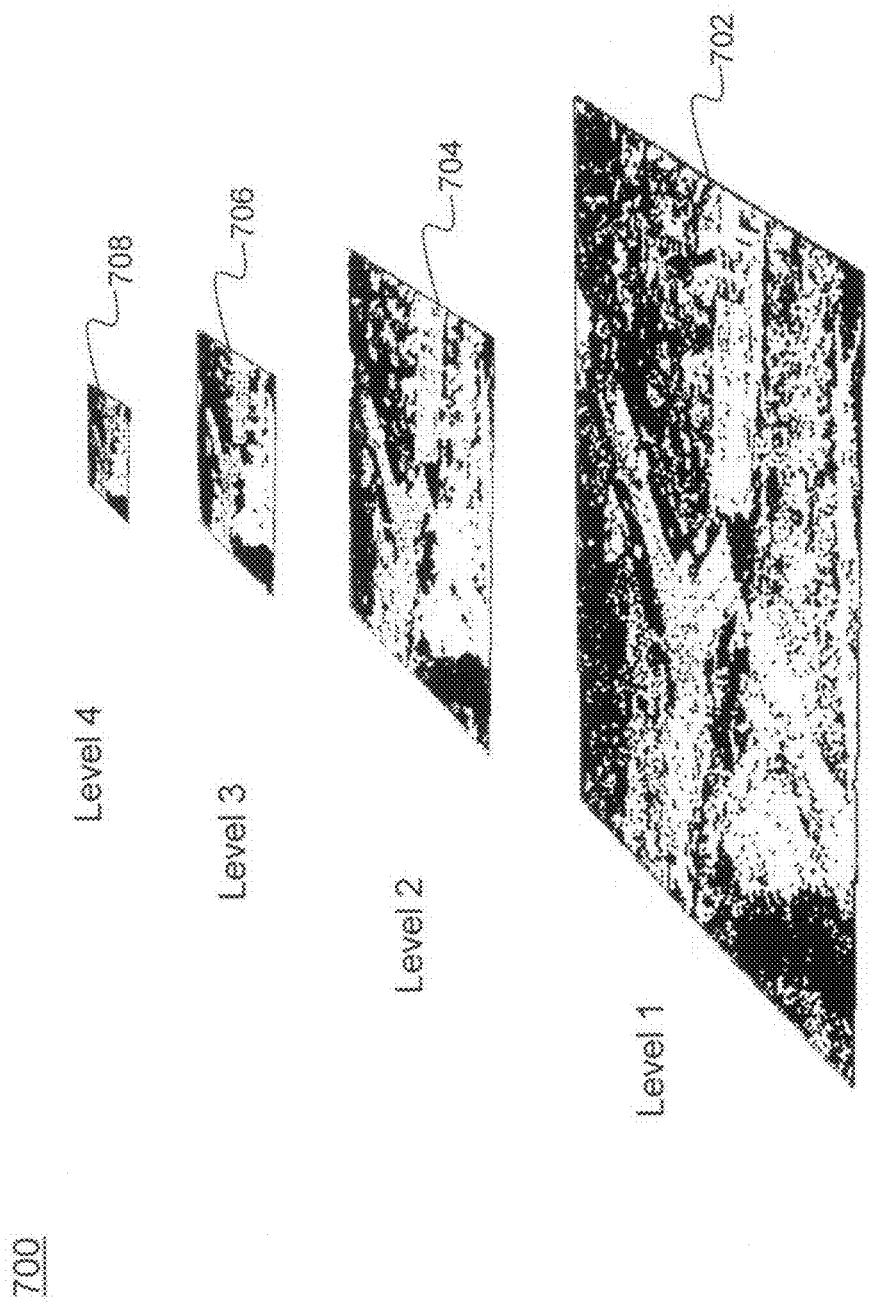
FIG. 7 illustrates a Gaussian image pyramid for image registration using PSO according to the present invention.

In a desired aspect, pyramid-based image registration starts with building a Gaussian pyramid 700 of the reference image and test image as depicted in FIG. 7. As a non-limiting example, starting at Level 1 702, the image is filtered with a Gaussian kernel of size 5 and a standard deviation of 1.0 and sub-sampled at a ratio of 2:1. The resulting image at Level 2 704 is half as big in each dimension as the original image at Level 1 702. The same process is repeated to generate as many levels as needed depending on the size of the final top level image. In a desired aspect, the present invention includes two more levels, a Level 3 706 and a Level 4 708 as illustrated in FIG. 7.

Next, the image windows for the test images are extracted from the test image pyramid 700 starting at Level 1 702, the original image size. The same set of image windows are selected from the remaining levels of the test image pyramid 700 at the corresponding size (reduced to a half, a quarter and so on in each dimension) and at the corresponding locations up the pyramid 700. The set of image windows from the test image pyramid 700 always corresponds to the same set of selected areas from the image no matter their sizes or pyramid 700 levels.

Figure 8:
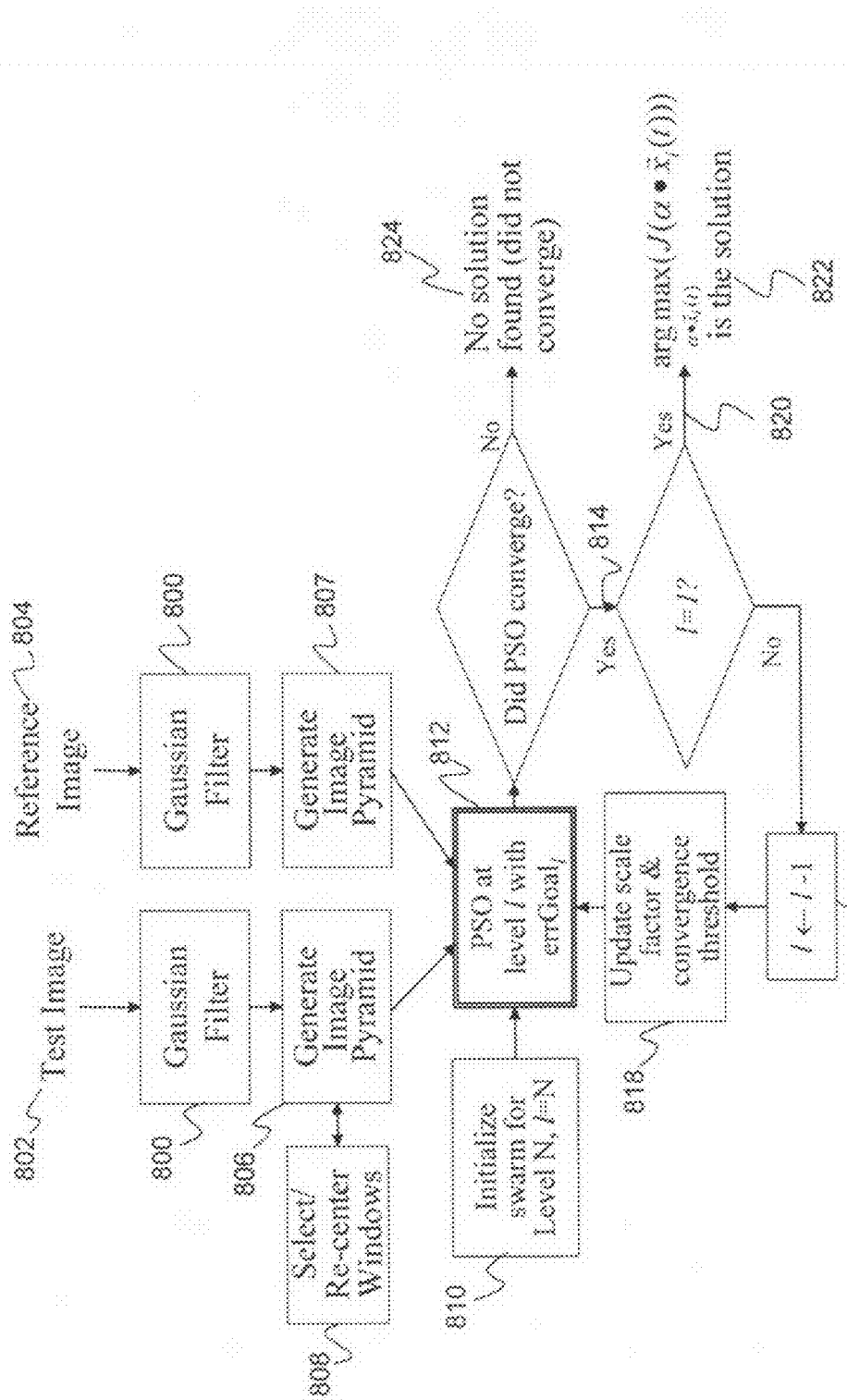
FIG. 8 is a flow diagram of pyramid-based image registration using PSO according to the present invention.

Registration with the image pyramid 700 begins at the top level (i.e., Level 4 708) of the pyramid 700, using the test image windows at that level and the reference image at the same level following a process similar to that described above for FIG. 3. As depicted in FIG. 8, Gaussian filters 800 are applied to an original test image 802 and original reference image 804, and an image pyramid is generated 806 and 807 for each image. Image windows are then selected 808 from the generated test image pyramid as described above. A particle swarm is initialized at a level N, where l=N 810. The registration is given a threshold, errGoal 812, for original image resolution at Level 1. For levels other than Level 1, the threshold is updated, or relaxed, by increasing the threshold 1.5 times at each successive level, for example. Thus, as a non-limiting example, the set of thresholds for a four-level pyramid situation would be errGoal, errGoal*1.5, errGoal*$1.5^2$, and errGoal*1.53 for levels 1 to 4, respectively. By relaxing convergence threshold at higher levels (i.e., increasing the threshold), convergence will be reached with fewer iterations in PSO. Relaxing of the threshold is appropriate at higher levels because at these levels, the goal is to guide the swarm towards the neighborhood of the optimum and allow the swarm to explore finer details of the objective function space at the next level. Therefore, accuracy is achieved at Level 1 and is not the objective at higher levels.

When the process converges at a higher level of the pyramid 814, the process then moves down the pyramid levels 816 and continues the PSO process with the swarm particles at their corresponding locations and velocities from the last pyramid level. Since a normalized parameter space for PSO is adopted, the swarm states (i.e., locations, velocities, swarm/individual best) are maintained in the normalized parameter space. All that needs to be addressed is switching to the reference image 804 and test image 802 windows at the new level as well as updating the convergence threshold (e.g., errGoal) and scale factor vector 818 for objective function evaluation. This process is repeated until convergence is reached at Level 1 820, at which point the corresponding solution from PSO is the final solution 822. If PSO failed to reach convergence after a preset number of iterations at any of the levels, the entire registration is considered to have failed 824. However, since the thresholds at the higher levels are relaxed, it is much less likely that the registration will fail at a higher level this way.

The evaluation of the objective function $J(\alpha \cdot \vec{x}_i(t))$ is carried out using the reference image 804 and the test image 802 windows at the same image pyramid levels. Because normalization was used in the objective function definition, the function value achieves comparable values regardless of the level of the image pyramid. This property simplifies the defining of convergence thresholds outlined above.

The following table summarizes the performance results of pyramid vs. non-pyramid based PSO image registration methods.

| Image Size/<br>Level | errGoal/<br>Thresh | # of<br>runs | # of runs<br>converged | Median total<br>iterations until<br>convergence |
|---|---|---|---|---|
| 1 | 10 | 200 | 148 | 15 |
| Pyramid 4 to 1 | 10 | 200 | 165 | 16 |

The same reference image and the same set of test image windows were used for two hundred Monte-Carlo runs. For each run, the test image was initialized at a random translation/rotation with respect to the reference image.

As illustrated in the table above, one benefit of pyramid-based image registration with PSO is an improved convergence rate. Because the process is initiated at a low-resolution image at the top of the image pyramid, the objective function surface has a broader peak relative to the image size, which offers a better chance for the swarm to find the optimum. As shown in the table above, the pyramid-based registration has 165 of 200 runs converged, while the non-pyramid-based approach has 148 of 200 runs converged. Furthermore, the pyramid-based approach has a median total number of iterations until convergence of 16, as compared to 15 using the non-pyramid based approach. Thus, the pyramid-based approach does not require substantially more iterations even though most of the iterations were done on the lower resolution levels of the pyramid.

An additional benefit of pyramid-based image registration with PSO is a reduced computation requirement. In the pyramid-based image registration, most of the objective function evaluations are carried out in the higher levels (i.e., lower resolution) with smaller image window sizes, which cost a fraction of computation compared with the full resolution images at Level 1. As illustrated in the table above, a pyramid-based approach achieves a better convergence rate than a non-pyramid based approach at a similar number of total iterations, resulting in a significantly lower computation requirement.

Figure 9:
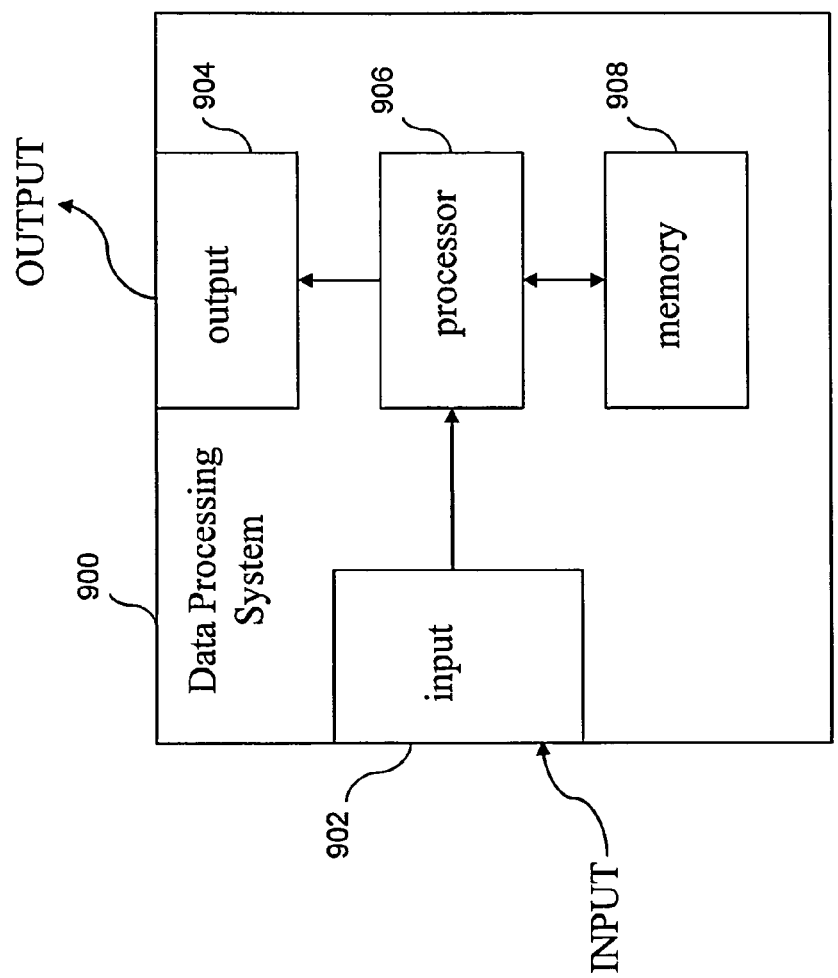
FIG. 9 is an illustration of a data processing system according to the present invention.

FIG. 9 illustrates a block diagram depicting components of a data processing system 900 (e.g., computer) incorporating the operations of the method described above. The method utilizes a data processing system 900 for storing computer executable instruction means for causing a processor (or processors) to carry out the operations of the above described method. The data processing system 900 comprises an input 902 for receiving information from a user. Information received may include input from devices such as cameras, scanners, keypads, keyboards, microphone, other peripherals such as storage devices, other programs, etc. The input 902 may include multiple "ports." An output 904 is connected with a processor 906 for providing information for transmission to other data processing systems, to storage devices, to display devices such as monitors, to generating information necessary for delivery, and to other mechanisms for presentation in user-usable forms. The input 902 and the output 904 are both coupled with the processor 906 (or processors), which may be a general-purpose computer processor or a specialized processor designed specifically for use with the present invention. The processor 906 is coupled with a memory 908 to permit storage of data and software to be manipulated by commands to the processor 906.

Figure 10:
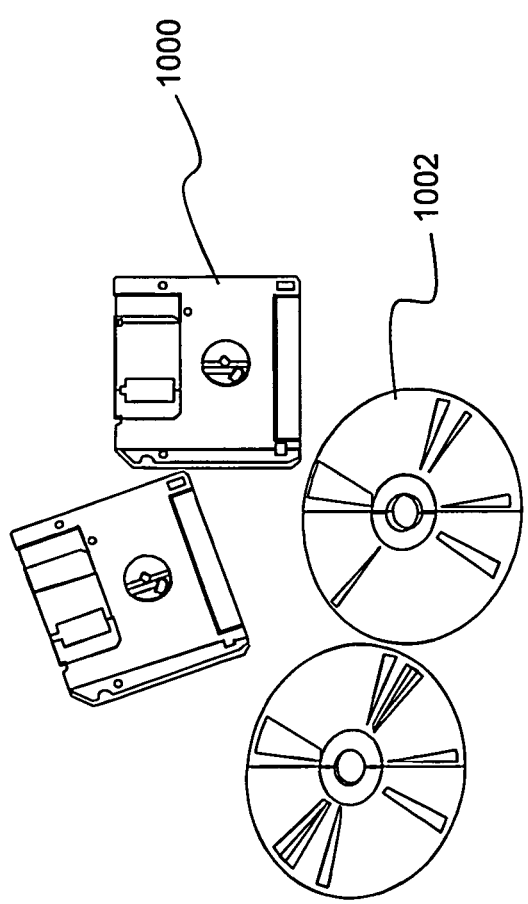
FIG. 10 is an illustration of a computer program product according to the present invention.

An illustrative diagram of a computer program product embodying the present invention is depicted in FIG. 10. As a non-limiting example, the computer program product is depicted as either a floppy disk 1000 or an optical disk 1002. However, as mentioned previously, the computer program product generally represents instruction means (i.e., computer readable code) stored on any compatible computer readable medium.

(5) CONCLUSION

In the present invention, a new image registration approach based on PSO is described. By using PSO for image registration, there is no need to match features from a test image with those in a reference image. Therefore, errors in mismatch of features can be avoided. Additionally, there is no need to define or detect features for the matching which can be unreliable in noisy images. Rather, a PSO-based approach relies on image windows which are more robust. There is also no need for complicated transformation parameter estimation using matched features, since in the PSO registration approach, the transformation model is always applied in the forward direction. Furthermore, PSO image registration is highly parallelizable as in normal PSO applications. For instance, the evaluation of each objective function for all test image windows can be parallelized. When the PSO image registration approach is extended to using pyramid-based images and image windows, the approach results in an improved convergence rate and reduced computation cost when compared to a non-pyramid based approach.

The invention claimed is:

1. A system for image registration utilizing particle swarm optimization, the system comprising one or more processors that are configured to perform operations of:
   selecting a set of image windows from a test image;
   transforming each image window from the test image, such that a transformation of each image window aligns each image window with a reference image having a center, resulting in a set of transformed image windows;
   configuring a plurality of software agents to operate as a cooperative swarm to optimize an objective function, wherein each agent is assigned an initial velocity vector to explore a multi-dimensional solution space, where each agent is configured to perform at least one iteration, the iteration being a search in the multi-dimensional solution space for a potential objective function where each agent keeps track of a first position vector representing a current individual best solution that the agent has identified, and a second position vector used to store the current global best solution among all agents;
   evaluating an objective function at the location of each agent, wherein the objective function represents a measure of registration quality between the set of transformed image windows and the reference image; and
   comparing the current global best solution found by all of the agents with an optimum solution, wherein if the global best solution is within a predetermined threshold of the optimum solution, then the global best solution represents the registration; and
   wherein the objective function is defined as:

$$J = \left(\frac{1}{N}\sum_{k=1}^{N}\lambda_k(I_{max} - \overline{d}_k)\right),$$

where N denotes the number of image windows, $\Sigma$ represents a summation, $\lambda_k$ denotes the fraction of overlap of a kth image window with the reference image, $I_{max}$ is the maximum pixel value of the test image, and $\overline{d}_k$ denotes the average absolute difference between the image window and the reference image.

2. A system for image registration utilizing particle swarm optimization as set forth in claim 1, wherein the system is further configured to perform operations of updating the position vectors for each agent according to the following:

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_i(t)]$$
$$\vec{x}_i(t+1) = \vec{x}_i(t) + \chi \vec{v}_i(t+1),$$

where $\vec{x}_i(t)$ is a position vector and $\vec{v}_i(t)$ is a velocity vector at a time t of an i-th agent, $c_1$ and $c_2$ are each parameters that weight an influence of the current best solution $\vec{y}_i$ found by agent i and the current global best solution $\vec{y}_g$ found by all of the agents, w is a momentum constant that prevents premature convergence of the agents, $\chi$ is a constriction factor which influences the convergence of the agents, and $q_1$ and $q_2$ are each random variables that allow the agents to better explore the multi-dimensional solution space.

3. A system for image registration utilizing particle swarm optimization as set forth in claim 2, wherein the system is further configured to perform operations of applying a Gaussian filter to the test image and the reference image to assist the convergence of the plurality of software agents.

4. A system for image registration utilizing particle swarm optimization as set forth in claim 3, wherein the system is further configured to perform operations of applying a translation to each image window in the set of image windows, the set of image windows comprising a center-of-gravity, such that the center-of-gravity of the set of image windows coincides with the center of the reference image.

5. A system for image registration utilizing particle swarm optimization as set forth in claim 4, wherein the system is further configured to perform operations of generating an image pyramid of both the test image and the reference image, each image pyramid having a plurality of levels comprising images, wherein each level of each image pyramid is an identical image having a different size and resolution.

6. A system for image registration utilizing particle swarm optimization as set forth in claim 5, wherein the plurality of software agents are configured to explore each level of each image pyramid in search of the objective function, wherein the agents begin at a top level of each image pyramid and continue down each image pyramid until convergence is reached at a lowest level of each image pyramid.

7. A system for image registration utilizing particle swarm optimization as set forth in claim 6, wherein the evaluation of the objective function is carried out at the same image pyramid levels using the reference image and a set of image windows extracted from the test image pyramid.

8. A computer-implemented method for image registration utilizing particle swarm optimization, the method comprising an act of causing a processor to perform operations of:
   selecting a set of image windows from a test image;
   transforming each image window from the test image, such that a transformation of each image window aligns each image window with a reference image having a center, resulting in a set of transformed image windows;
   configuring a plurality of software agents to operate as a cooperative swarm to optimize an objective function, wherein each agent is assigned an initial velocity vector to explore a multi-dimensional solution space, where each agent is configured to perform at least one iteration, the iteration being a search in the multi-dimensional solution space for a potential objective function where each agent keeps track of a first position vector representing a current individual best solution that the agent has identified, and a second position vector used to store the current global best solution among all agents;

evaluating an objective function at the location of each agent, wherein the objective function represents a measure of registration quality between the set of transformed image windows and the reference image; and comparing the current global best solution found by all of the agents with an optimum solution, wherein if the global best solution is within a predetermined threshold of the optimum solution, then the global best solution represents the registrations;

wherein the objective function is defined as:

$$J = \left(\frac{1}{N}\sum_{k=1}^{N}\lambda_k(I_{max} - \overline{d}_k)\right),$$

where N denotes the number of image windows, $\Sigma$ represents a summation, $\lambda_k$ denotes the fraction of overlap of a kth image window with the reference image, $I_{max}$ is the maximum pixel value of the test image, and $\overline{d}_k$ denotes the average absolute difference between the image window and the reference image.

9. A method for image registration utilizing particle swarm optimization as set forth in claim 8, further comprising acts of updating the position vectors for each agent according to the following:

$$\vec{v}_i(t+1) = w\vec{v}_i(t) + c_1q_1[\vec{y}_i(t) - \vec{x}_i(t)] + c_2q_2[\vec{y}_g(t) - \vec{x}_i(t)]$$
$$\vec{x}_i(t+1) = \vec{x}_i(t) + \chi\vec{v}_i(t+1),$$

where $\vec{x}_i(t)$ is a position vector and $\vec{v}_i(t)$ is a velocity vector at a time t of an i-th agent, $c_1$ and $c_2$ are each parameters that weight an influence of the current best solution $\vec{y}_i$ found by agent i and the current global best solution $\vec{y}_g$ found by all of the agents, w is a momentum constant that prevents premature convergence of the agents, $\chi$ is a constriction factor which influences the convergence of the agents, and $q_1$ and $q_2$ are each random variables that allow the agents to better explore the multi-dimensional solution space.

10. A method for image registration utilizing particle swarm optimization as set forth in claim 9, further comprising acts of applying a Gaussian kernel to the test image and the reference image to assist the convergence of the plurality of software agents.

11. A method for image registration utilizing particle swarm optimization as set forth in claim 10, further comprising acts of applying a translation to each image window in the set of image windows, the set of image windows comprising a center-of-gravity, such that the center-of-gravity of the set of image windows coincides with the center of the reference image.

12. A method for image registration utilizing particle swarm optimization as set forth in claim 11, further comprising acts of generating an image pyramid of both the test image and the reference image, each image pyramid having a plurality of levels comprising images, wherein each level of each image pyramid is an identical image having a different size and resolution.

13. A method for image registration utilizing particle swarm optimization as set forth in claim 12, wherein the plurality of software agents are configured to explore each level of each image pyramid in search of the objective function, wherein the agents begin at a top level of each image pyramid and continue down each image pyramid until convergence is reached at a lowest level of each image pyramid.

14. A method for image registration utilizing particle swarm optimization as set forth in claim 13, wherein the evaluation of the objective function is carried out at the same image pyramid levels using the reference image and a set of image windows extracted from the test image pyramid.

15. A computer program product for image registration utilizing particle swarm optimization, the computer program product comprising computer-readable instruction means stored on a non-transitory computer-readable medium that are executable by a computer having a processor for causing the processor to perform operations of:

selecting a set of image windows from a test image;

transforming each image window from the test image, such that a transformation of each image window aligns each image window with a reference image having a center, resulting in a set of transformed image windows;

configuring a plurality of software agents to operate as a cooperative swarm to optimize an objective function, wherein each agent is assigned an initial velocity vector to explore a multi-dimensional solution space, where each agent is configured to perform at least one iteration, the iteration being a search in the multi-dimensional solution space for a potential objective function where each agent keeps track of a first position vector representing a current individual best solution that the agent has identified, and a second position vector used to store the current global best solution among all agents;

evaluating an objective function at the location of each agent, wherein the objective function represents a measure of registration quality between the set of transformed image windows and the reference image; and comparing the current global best solution found by all of the agents with an optimum solution, wherein if the global best solution is within a predetermined threshold of the optimum solution, then the global best solution represents the registration;

wherein the objective function is defined as:

$$J = \left(\frac{1}{N}\sum_{k=1}^{N}\lambda_k(I_{max} - \overline{d}_k)\right),$$

where N denotes the number of image windows, $\Sigma$ represents a summation, $\lambda_k$ denotes the fraction of overlap of a kth image window with the reference image, $I_{max}$ is the maximum pixel value of the test image, and $\overline{d}_k$ denotes the average absolute difference between the image window and the reference image.

16. A computer program product for image registration utilizing particle swarm optimization as set forth in claim 15, further comprising instruction means for updating the position vectors for each agent according to the following:

$$\vec{v}_i(t+1) = w\vec{v}_i(t) + c_1q_1[\vec{y}_i(t) - \vec{x}_i(t)] + c_2q_2[\vec{y}_g(t) - \vec{x}_i(t)]$$
$$\vec{x}_i(t+1) = \vec{x}_i(t) + \chi\vec{v}_i(t+1),$$

where $\vec{x}_i(t)$ is a position vector and $\vec{v}_i(t)$ is a velocity vector at a time t of an i-th agent, $c_1$ and $c_2$ are each parameters that weight an influence of the current best solution $\vec{y}_i$ found by agent i and the current global best solution $\vec{y}_g$ found by all of the agents, w is a momentum constant that prevents premature convergence of the agents, $\chi$ is a constriction factor which influences the convergence of the agents, and $q_1$ and $q_2$ are each random variables that allow the agents to better explore the multi-dimensional solution space.

17. A computer program product for particle swarm optimization as set forth in claim 16, further operable for applying a Gaussian kernel to the test image and the reference image to assist the convergence of the plurality of software agents.

18. A computer program product for image registration utilizing particle swarm optimization as set forth in claim 17, further operable for applying a translation to each image window in the set of image windows, the set of image windows comprising a center-of-gravity, such that the center-of-gravity of the set of image windows coincides with the center of the reference image.

19. A computer program product for image registration utilizing particle swarm optimization as set forth in claim 18, further operable for generating an image pyramid of both the test image and the reference image, each image pyramid having a plurality of levels comprising images, wherein each level of each image pyramid is an identical image having a different size and resolution.

20. A computer program product for image registration utilizing particle swarm optimization as set forth in claim 19, wherein the plurality of software agents are configured to explore each level of each image pyramid in search of the objective function, wherein the agents begin at a top level of each image pyramid and continue down each image pyramid until convergence is reached at a lowest level of each image pyramid.

21. A computer program product for image registration utilizing particle swarm optimization as set forth in claim 20, wherein the evaluation of the objective function is carried out at the same image pyramid levels using the reference image and a set of image windows extracted from the test image pyramid.

* * * * *